(12) United States Patent
Mizusaki et al.

(10) Patent No.: US 8,657,915 B2
(45) Date of Patent: Feb. 25, 2014

(54) METAL POWDER AND MANUFACTURING METHODS THEREOF

(75) Inventors: Yujiro Mizusaki, Fukushima-ken (JP); Isao Sugiyama, Fukushima-ken (JP); Hitoshi Iijima, Tokyo (JP); Osamu Kubota, Fukushima-ken (JP)

(73) Assignee: Global Advanced Metals Japan, K.K., Tokyo (JP)

( * ) Notice: Subject to any disclaimer, the term of this patent is extended or adjusted under 35 U.S.C. 154(b) by 1643 days.

(21) Appl. No.: 11/919,464

(22) PCT Filed: May 31, 2006

(86) PCT No.: PCT/JP2006/311350
§ 371 (c)(1),
(2), (4) Date: Oct. 29, 2007

(87) PCT Pub. No.: WO2006/129850
PCT Pub. Date: Dec. 7, 2006

(65) Prior Publication Data
US 2009/0080145 A1    Mar. 26, 2009

(30) Foreign Application Priority Data

May 31, 2005 (JP) ................. 2005-159310
Sep. 15, 2005 (JP) ................. 2005-268111
Sep. 15, 2005 (JP) ................. 2005-268197

(51) Int. Cl.
*B22F 1/00*       (2006.01)
*B22F 9/00*       (2006.01)
*C21B 15/04*      (2006.01)
*C22B 5/20*       (2006.01)
*C22C 1/04*       (2006.01)

(52) U.S. Cl.
USPC ................... 75/354; 419/31; 419/33

(58) Field of Classification Search
USPC ............................ 521/50; 75/354; 419/30, 33
See application file for complete search history.

(56) References Cited

U.S. PATENT DOCUMENTS 4,017,302 A * 4/1977 Bates et al. ............... 75/245
5,954,856 A    9/1999 Pathare et al.
(Continued)

FOREIGN PATENT DOCUMENTS

CN       1468550 A      1/2004
JP       56099010 A  *  8/1981
(Continued)

OTHER PUBLICATIONS

Notification of Transmittal of the International Search Report and the Written Opinion of the International Searching Authority, International Search Report, and Written Opinion for PCT/JP2006/311350 dated Sep. 12, 2006.

(Continued)

*Primary Examiner* — Weiping Zhu
(74) *Attorney, Agent, or Firm* — Kilyk & Bowersox, P.L.L.C.

(57) ABSTRACT

The present invention provides a metal powder composed of tantalum or niobium that achieves both sinterability and fluidity and the manufacturing method thereof. The present invention also provides a tantalum or niobium powder that enables the manufacturing of an anode for a solid electrolytic capacitor in which holes are formed for a conductive polymer-containing solution to pass through, without using a hole molding material or pore forming material. Furthermore, the present invention provides an anode for a solid electrolytic capacitor that enables the manufacturing of a high-volume and low ESR solid electrolytic capacitor. The present invention further provides a manufacturing method of a metal powder that allows the manufacturing of a metal powder of a given diameter range from a raw powder at high yield, without requiring a lot of work and time.

24 Claims, 4 Drawing Sheets

(56) References Cited

U.S. PATENT DOCUMENTS

| | | | |
|---|---|---|---|
| 7,204,866 B2 | 4/2007 | Oda et al. | |
| 2003/0181538 A1* | 9/2003 | Martel et al. | 521/50 |

FOREIGN PATENT DOCUMENTS

| JP | 60-001443 | | 1/1985 |
|---|---|---|---|
| JP | 02-034701 | | 2/1990 |
| JP | 03-291301 | | 12/1991 |
| JP | 04-362101 | | 12/1992 |
| JP | 04-364858 | | 12/1992 |
| JP | 04362101 A | * | 12/1992 |
| JP | 06-295844 | | 10/1994 |
| JP | 09-287004 | | 11/1997 |
| JP | 2000-509103 | | 7/2000 |
| JP | 2001-345238 | | 12/2001 |
| JP | 2002-093666 | | 3/2002 |
| JP | 2003-045757 | | 2/2003 |
| JP | 2003-147402 | | 5/2003 |
| JP | 2004-122121 | | 4/2004 |

OTHER PUBLICATIONS

English translation of Second Office Action received in corresponding Chinese Patent Application No. 200680018716.8 dated Feb. 24, 2010 (6 pages).

Office Action issued for Japanese Patent Application No. 2005-159310 dated Oct. 4, 2011, with English translation (4 pages).

Office Action issued for Japanese Patent Application No. 2005-268197 dated Oct. 11, 2011, with English translation (8 pages).

* cited by examiner

METAL POWDER AND MANUFACTURING METHODS THEREOF

TECHNICAL FIELD

This application is a National Stage Application of PCT/JP2006/311350, filed May 31, 2006 and claims priority from Japanese Patent Application Nos. JP 2005-159310 filed May 31, 2005, JP 2005-268111 filed Sep. 15, 2005, and JP 2005-268197 filed Sep. 15, 2005, all incorporated in their entirety by reference herein.

The present invention relates to a metal powder composed of tantalum or niobium and manufacturing methods thereof. The present invention also relates to a tantalum or niobium powder used for an anode for a solid electrolytic capacitor, and an anode for a solid electrolytic capacitor.

BACKGROUND ART

Tantalum powder and niobium powder have been widely used as materials for an anode electrode for solid electrolytic capacitors. To manufacture tantalum powder or niobium powder for use as an anode electrode in a solid electrolytic capacitor, for example, tantalum fine powder or niobium fine powder can be obtained first by a sodium reduction method of tantalum salt or niobium salt in diluent salt or a hydrogen reduction method of tantalum chloride or niobium chloride. Next, using the tantalum fine powder or the niobium fine powder as raw powder, granulated powder can be formed by a pan-type granulator. After thermal aggregation of the granulated powder, the obtained agglomerate powder can be crushed by a crusher, such as a chopper mill. Then, the obtained crushed powder can be sifted, and powder of a given diameter range is recovered to form a product (for example, see Japanese Unexamined Patent Application Publication H4-362101). In addition, for purposes of increasing the yield of powder having a given diameter range, powder outside of the given diameter range may be recycled. In particular, powder larger than the given diameter range may be mixed with an agglomerate powder to be crushed again, while powder smaller than the given diameter range may be mixed with tantalum raw powder to be granulated again. However, since the crusher used by conventional manufacturing methods has a strong impact on crushing the powder, the particle size distribution of the obtained powder broadens. Thus, it has been difficult to obtain a powder having a particular diameter range at high yield.

In conventional manufacturing methods, repeating granulation or crushing several times to increase the yield of powder having a particular diameter range tends to decrease the unevenness of the powder surface, resulting in a shape inconvenient for thermal aggregation. Therefore, the number of times of re-granulation and re-crushing has been limited, and so the hard-to-thermally agglomerate tantalum powder has been returned to tantalum salt, for eventual use as a material for tantalum raw powder. Accordingly, in conventional manufacturing methods, to increase the yield of powder of a given diameter range, there are limitations on improving the yield, in addition to the need for a lot of work and time.

Tantalum powder and niobium powder obtained by conventional manufacturing methods can have many surface concaves and convexes and the surface can be markedly uneven. Since powder of such shape has a large contact area to contact with other powder, the sinterability required for the powder used for an anode electrode can be ensured. However, there is a problem in that the fluidity is low due to the large flow resistance.

On the other hand, using rough spherical powder is one way to increase the fluidity. However, in that case, the contact area of particles is reduced, resulting in a decrease in the sinterability. In other words, it is conventionally difficult to obtain tantalum powder and niobium powder that achieve both sinterability and fluidity.

With respect to tantalum powder or niobium powder for use as an anode electrode in a solid electrolytic capacitor, for example, it is useful that the powder have a small diameter so as to be easily filled in a small die for making of the electrode, as well as a narrow particle distribution range. Therefore, for example, to manufacture a tantalum powder for an anode electrode, the above manufacturing method has been employed.

In a solid electrolytic capacitor, a tantalum or niobium porous sintered body can be used for an anode, an oxide film formed from the anode surface can be used as a dielectric layer, and a conductive polymer or other material can be used as a cathode. For example, solid electrolytic capacitors can be manufactured by sintering a tantalum or niobium powder to obtain a porous sintered body, oxidizing the surface of the porous sintered body by electrolytic oxidation and the like to form a dielectric layer, and impregnating a solution containing a conductive polymer (hereinafter, referred to as a conductive polymer-containing solution) into the dielectric layer to form a cathode.

Recently, further demand has been made for a high-volume capacitor. In order to increase the surface area of the dielectric layer, there has been a trend towards using smaller diameter tantalum powder or niobium powder for molding a porous sintered body, resulting in a porous sintered body with smaller holes or pores. However, the viscosity of the conductive polymer-containing solution can be high and, therefore, if the holes or pores of the porous sintered body are small, it becomes hard for the conductive polymer-containing solution to impregnate into the holes or pores, which inhibits the sufficient molding of the cathode into the holes or pores. As a result, there has been a problem in that the equivalent series resistance (ESR) of the solid electrolytic capacitor increases.

Japanese Unexamined Patent Application Publication 2001 345238 proposes a method of manufacturing a porous sintered body by adding an acid dissolving or a heat sublimation hole molding material (hole forming material) as well as implementing acid treatment or heat treatment, and simultaneously molding new holes on the porous sintered body by removing the hole molding material. According to the method, the conductive polymer-containing solution passes through newly formed holes, thereby increasing the permeability.

However, the method according to Japanese Unexamined Patent Application Publication 2001 345238 involves a lot of work, as it requires a process for adding the hole molding material as well as a process for removing it. Thus, demand has been made to manufacture an anode for a solid electrolytic capacitor in which holes are formed for the conductive polymer-containing solution to pass through, without using the hole molding material. To date, a method that does not use any hole or pore forming material has not been known.

In one aspect of the present invention, the present invention takes into account these circumstances and provides a tantalum or niobium powder that can be used to manufacture an anode for a solid electrolytic capacitor in which holes (passageways or voids or pores) are formed for the conductive polymer-containing solution to pass through, without using a hole or pore molding (or forming) material. Furthermore, the present invention intends to provide an anode for a solid electrolytic capacitor that can be used in manufacturing a high-volume and low ESR solid electrolytic capacitor.

The present invention, in at least one embodiment, has also been created in consideration of said circumstances, with the intention of providing a metal powder composed of tantalum or niobium that achieves both sinterability and fluidity and the manufacturing methods thereof.

The present invention also takes into account the circumstances described above and intends to provide a method of making a metal powder that allows the manufacturing of metal powder having a given diameter range from a raw powder at high yield, and preferably without requiring a lot of work and time. The present invention further intends to provide a powder having a given diameter range.

DISCLOSURE OF INVENTION

In one embodiment, the manufacturing method of the metal powder of the present invention can comprise:

a thermal aggregation process for obtaining agglomerate powder by thermal aggregation of raw powder composed of tantalum or niobium; and a pulverization process for pulverizing said agglomerate powder by a pulverizer equipped with differential rolls.

The manufacturing method of the metal powder of the present invention may include a preliminary crushing process for crushing agglomerate powder prior to the pulverization process.

In addition, in one embodiment of the manufacturing method of the metal powder of the present invention, raw powder may be pulverized raw powder, for instance, obtained by compression molding of tantalum fine powder or niobium fine powder that is then pulverized by a pulverizer equipped with differential rolls.

In one embodiment, the metal powder of the present invention can be characterized in that the powder is a polyhedral particle composed of tantalum or niobium, wherein plane surfaces are formed on three or more parts of the surface occupying 30-70% of the total surface area.

In one embodiment, the manufacturing method of the metal powder of the present invention comprises: a compression molding process for obtaining a compact by compression molding of a tantalum raw powder or a niobium raw powder; and a pulverization process for pulverizing said compact by a pulverizer equipped with differential rolls. Wherein, it preferably includes a thermal aggregation (or agglomeration) process for thermally agglomerating a pulverized powder obtained from the pulverization process.

In addition, in one embodiment, the manufacturing method of the metal powder of the present invention preferably comprises: a recovery process for recovering powder of a given diameter range by sifting the pulverized powder obtained from the pulverization process; and a return process for returning a residual powder outside a given diameter range to the compression molding process or the pulverization process after the recovery process. Wherein, the process preferably includes a thermal aggregation process for thermally agglomerating a powder of a given diameter range recovered from the recovery process.

Tantalum raw powder and niobium raw powder have moderate ductility as a metal as well as high-strength at a significantly high melting point. Therefore, raw powder can attach (or agglomerate) to each other to the extent that it can be pulverized by compression molding; thereby, a compact adequate for the anode electrode material of a capacitor can be obtained. When forming a compact by compression molding, the process is preferably carried out in the substantial absence or absence of oxygen in order to maintain the surface activity.

In one embodiment, the tantalum or niobium powder of the present invention can be a porous body composed of high-order particles, wherein the diameter of substantially all particles falls within a range of 45-75 µm. The tantalum or niobium powder of the present invention is particularly preferable to be used for an anode electrode material of a capacitor, such as a solid electrode capacitor. The anode for a solid electrolytic capacitor of the present invention can be obtained by sintering said tantalum powder or said niobium powder.

EXPLANATION OF THE SYMBOLS

14 Tantalum or niobium fine powder
20 Roll granulator (pulverizer)
21 Differential roll

BEST MODE FOR CARRYING OUT THE INVENTION

According to one manufacturing method of the metal powder of the present invention, it is possible to manufacture a metal powder composed of tantalum or niobium (or both) that achieves both sinterability and fluidity.

In one embodiment, the metal powder of the present invention is composed of tantalum or niobium and optionally can achieve sinterability and/or fluidity.

According to one manufacturing method of the metal powder of the present invention, it is possible to manufacture a metal powder of a given diameter range from a raw powder at high yield, without requiring a lot of work and time.

In the manufacturing method of the metal powder of the present invention, the yield of powder of a given diameter range can be increased by recovering a powder of a given diameter range and returning a residual powder outside the given diameter range to the compression molding process or the pulverization process.

Furthermore, in one manufacturing method of the metal powder of the present invention, it is possible to strengthen the metal powder by thermal aggregation of a pulverized powder obtained from the pulverization process or a powder of a given diameter range.

According to the tantalum or niobium powder of the present invention, it is possible to manufacture an anode for a solid electrolytic capacitor in which holes or passageways or pores are formed for the conductive polymer-containing solution to pass through, without using a hole molding material, and/or pore forming material.

In one or more embodiments, a high-volume and low ESR solid electrolytic capacitor can be made with the tantalum or niobium powder of the present invention, when formed into an anode.

Figure 5:
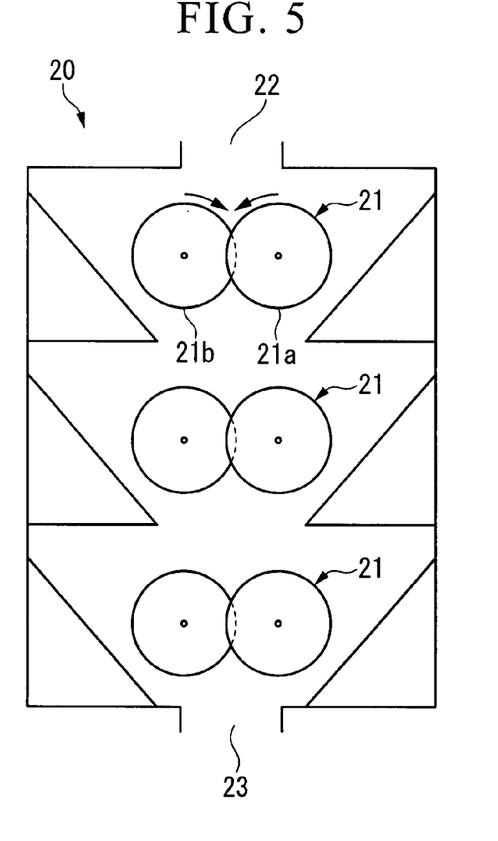
FIG. 5 is a pattern diagram showing one example of a pulverizer used for the pulverization process in one embodiment of the manufacturing method of the metal powder of the present invention.
Figure 6:
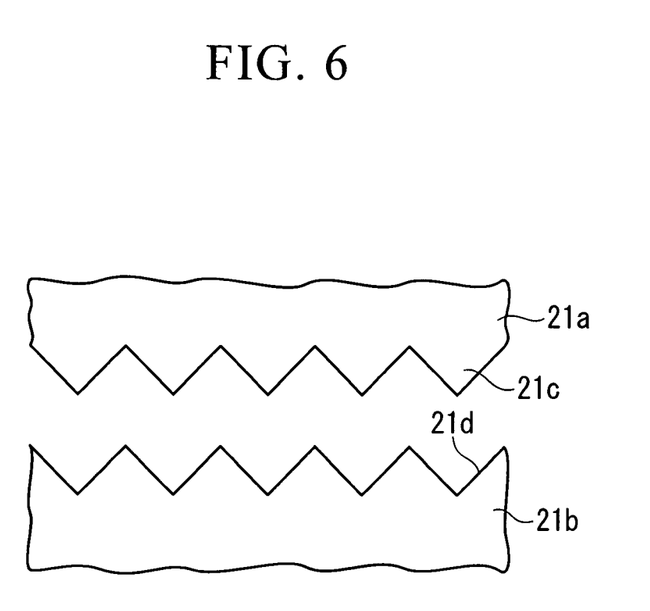
FIG. 6 is an enlarged view of the main part of the pulverizer in FIG. 5.

In one or more embodiments, the manufacturing method of the metal powder of the present invention comprises a thermal aggregation process for obtaining agglomerate powder by thermal aggregation of raw powder composed of tantalum or niobium, and a pulverization process for pulverizing said agglomerate powder by a pulverizer equipped with differential rolls. The manufacturing method of the metal powder of the present invention can comprise a compression molding process for obtaining a compact by compression molding of tantalum raw powder or niobium raw powder, and a pulverization process for pulverizing said compact by a pulverizer (roll granulator 20) equipped with differential rolls 21. Further, the manufacturing method of the metal powder of the present invention preferably comprises a recovery process for recovering a powder of a given diameter range by sifting a pulverized powder obtained from said pulverization process, and a return process for returning a residual powder outlying the given diameter range to said compression molding process or said pulverization process after said recovery process. The metal powder of the present invention can be a polyhedral particle composed of tantalum or niobium, wherein plane surfaces are formed on three or more parts of the surface occupying 30-70% of the total surface area. The tantalum or niobium powder of the present invention can be a porous body composed of high-order particles, with the diameter of substantially all particles falling within a range of 45-75 μm. An anode for a solid electrolytic capacitor of the present invention can be obtained by sintering said tantalum powder or said niobium powder.

The manufacturing method of the metal powder in one embodiment is a method comprising: a thermal aggregation process for obtaining agglomerate powder by thermal aggregation of raw powder composed of tantalum (also referred to as tantalum raw powder); an optional preliminary crushing process for crushing the agglomerate powder in advance; a pulverization process for pulverizing the agglomerate powder, either obtained from the preliminary crushing process or pulverization process; and a recovery process for recovering powder of a given diameter range by sifting the pulverized powder obtained from the pulverization process. Each process is explained in detail below.

The method of thermal aggregation in the thermal aggregation process includes, for example, a method of heating tantalum raw powder in a furnace. Any furnace or other device for heating powder can be used. The temperature for thermal aggregation is any temperature sufficient to achieve thermal agglomeration, such as from 900 to 1,200° C., and preferably around 1,050° C. The temperature is with reference to the furnace setting. The time for thermal aggregation can be any time, such as from 5 minutes to 10 hours or more, for instance, 10 minutes to 2 hours, or 30 minutes to 2 hours. For purposes of the present invention, aggregation includes agglomeration.

Preferably, the agglomerate or aggregate size as a result of this thermal aggregation can be from 45 to 5,000 μm (e.g., 100 μm to 4,000 μm; 300 μm to 4,000 μm; 750 μm to 3,000 μm). The average agglomerate size can be within this range as well. Furthermore, since preliminary grinding can be simplified or omitted, the agglomerate size range of from 45 to 3,000 μm can be obtained.

The tantalum raw powder may be around 3-5 μm in size of tantalum fine powder obtained by the sodium reduction of a tantalum salt, such as sodium tantalate fluoride, in diluent salt, tantalum fine powder obtained by reducing of 3-5 μm tantalum fine powder with solid reductant, and the like. In addition, the tantalum raw powder may be treated by preliminary thermal aggregation in advance, and may also be a granulated powder obtained by granulating with water as a binder, such as described in U.S. Pat. No. 6,479,012.

The tantalum raw powder may be pulverized raw powder obtained by pulverizing a compact with a machine similar to the pulverizer used in the pulverization process after obtaining a compact from compression molding of the tantalum fine powder. By using pulverized raw powder as raw powder, the preliminary crushing process can be simplified or omitted to achieve particles of an intended diameter range. In addition, the number of rolls used in the pulverization process can be decreased.

In compression molding, for example, a method using a press device can be employed. One press device may be exemplified as a press device 10 shown in FIG. 1 that is equipped with a rectangular mold 11 on which a circular section through-hole 11a is formed in a vertical direction, a cylindrical support 12 inserted in the through-hole 11a of the molding 11 from below, and a cylindrical pressurizer 13 inserted in the through-hole 11a of the molding 11 from above. In the press device 10, the inner diameter of the through-hole 11a and the outer diameter of the support 12 and the pressurizer 13 are substantially equal.

Figure 2:
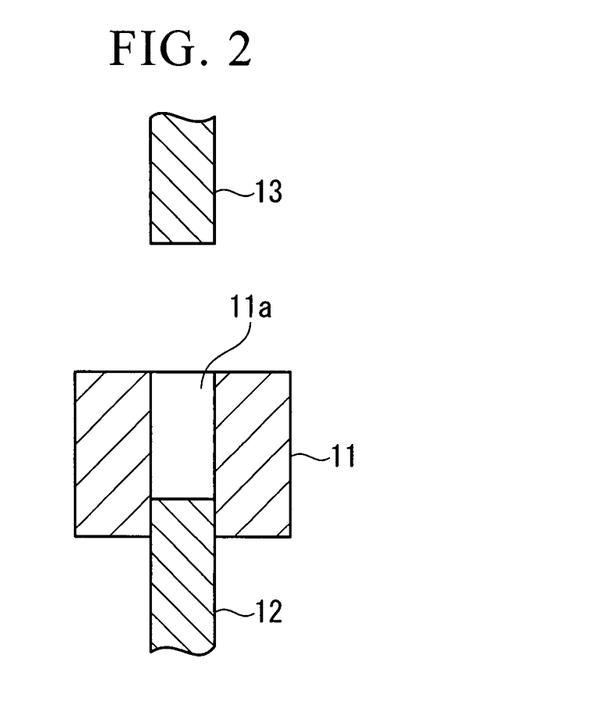
FIG. 2 is a cross section showing one process of compression molding using the press device in FIG. 1.
Figure 4:
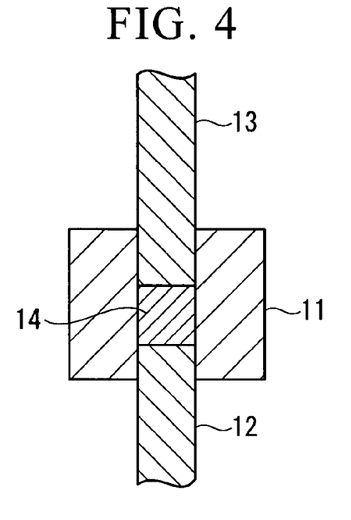
FIG. 4 is a cross section showing one process of compression molding using the press device in FIG. 1.

In compression molding with the press device 10, as shown in FIG. 2, firstly, the support 12 is raised and slightly inserted in the lower side of the through-hole 11a of the molding 11 to create a cylindrical form. Next, a given amount of the tantalum or niobium fine powder 14 is filled from the upper side of the through-hole 11a. As shown in FIG. 4, the pressurizer 13 is lowered and inserted in the through-hole 11a. Then, the tantalum or niobium fine powder 14 filled in the through-hole 11a is molded by compression to obtain a compact. The compact is removed by lowering the support 12 and pushing it out with the pressurizer 13, or by raising the pressurizer 13 and pushing it out with the support 12. In compression molding, the volume density of the obtained compact is preferably set to be around 4-5 g/cm³. Other densities can be used.

In the preliminary crushing process, agglomerate powder is crushed by a crusher. The crusher may be exemplified as a crusher for primary breaking such as a chopper mill, a speed mill, a jaw crusher, a cutter mill, or a screen mill. In the preliminary crushing process, the agglomerate powder can be preferably crushed into a size of 45-5,000 μm, and more preferably a size of 45-3,000 μm.

In the pulverization process, the crushed powder is pulverized by a pulverizer, such as a pulverizer equipped with differential rolls. The pulverizer equipped with differential rolls may be exemplified as a roll granulator 20 having three levels of differential rolls 21, as shown in FIG. 5. Wherein, the differential roll 20 has two rolls 21a, 21b that are spaced apart. These rolls reverse each other at respectively different revolutions. In addition, as shown in FIG. 6, concaves and convexes are formed on each peripheral surface of the rolls 21a, 21b at identical intervals. The two rolls 21a, 21b are placed such that a convex 21c of one roll 21a opposes a concave 21d of the other roll 21b. Regarding the difference in peripheral velocity of the two rolls 21a, 21b in the differential roll 21, the peripheral velocity of one roll 21a is preferably faster than that of the other roll 21b by 20% or more (e.g., from 20% to 75% or more, or from 35% to 70%, or from 45% to 60%), since powder of a given diameter range can be obtained at high yield.

In the roll granulator 20, the three levels of differential rolls are preferably placed with decreasing space between the roll 21a and the roll 21b in order from the top. By doing so, the particle diameter can be gradually decreased, which allows the yield of powder within a given diameter range to be increased.

When pulverizing crushed powder using the roll granulator 20 as described above, the crushed powder is fed from the upper entrance 22 using gravity, the diameter is decreased by passing through each differential roll 21 in order from the top, and the pulverized powder is drained out of the lower exit 23 and transferred to the next process.

As a pulverizer, devices other than the roll granulator can be used and are preferably equipped with differential rolls, for example, a differential slit roll. A differential slit roll has two spaced apart rolls with flat peripheral surfaces. These rolls reverse each other at respectively different revolutions.

As a method of sifting in the recovery process, for example, a method of sifting pulverized powder by piling two sieves with different size openings is exemplified. Wherein, one of the two sieves sifts powder at a size below the upper limit of the given diameter range but does not sift powder at a size above the upper limit of the given diameter range. The other sieve sifts powder at a size under the lower limit of the given diameter range, but does not sift powder at a size above the lower limit of the given diameter range. The former sieve is placed below the latter for usage.

In addition, as a method of sifting, for example, an oscillation method, a perikinetic method and the like may be used. Wherein, the oscillation method refers to a method of moving the piled sieves up and down and the perikinetic method refers to a method of circulating the piled sieves in a horizontal direction. The perikinetic method is preferred, since it causes smaller shock, a decreased amount of powder smaller than the given diameter range, and less noise.

From powder outside of the given diameter range remaining in the recovery process, powder smaller than the given diameter range is preferably returned to the thermal aggregation process and powder larger than the given diameter range is returned to the pulverization process. In doing so, by reusing powder outside of the given diameter range, it is possible to increase the yield of powder within the given diameter range.

In one or more embodiments, the above described manufacturing method enables the pulverization of crushed powder by thermally aggregating tantalum or niobium raw powder and passing the preliminary crushed raw powder through two differential rolls with different revolutions to provide a stretching force. According to the pulverization method, the crushed powder can be pulverized without giving strong shock. Therefore, while the plane surfaces are formed on the surface by the stretching force, the rotating effect prevents flattening due to the differential and allows the tantalum powder to maintain its substantially spherical shape. The powder with plane surfaces formed on the surface has a large contact area with other particles resulting in an increase in the sinterability. Furthermore, powder substantially spherical in shape has little flowing resistance, which increases the fluidity. In other words, the tantalum powder obtained by said manufacturing method achieves both sinterability and fluidity.

In particular, according to said manufacturing method, it is possible to obtain a polyhedral particle with plane surfaces formed on three or more parts of the surface, for instance, occupying 30-70% (e.g., 40% to 65%; 45% to 60%; 50% to 70%) of the total surface area. Wherein, plane surface refers to a surface that has substantially zero curvature due to a chipped sphere surface and occupies 3-10% of the total particle surface area. When the ratio of the plane surface is 30% or more, the sinterability increases. Whereas, when the ratio is 70% or lower, the fluidity increases. When the curvature is substantially zero and the formed surface occupies over 10% of the total particle surface area, the fluidity decreases. The ratio of the plane surface can be obtained by image analysis using a scanning electron micrograph, or other analysis techniques.

The present invention is not limited to said embodiments. For example, although the manufacturing method of said embodiments includes a preliminary crushing process, this process may be omitted. With the optional preliminary crushing process, the efficiency of the pulverization process improves.

In addition, in said embodiments, the pulverizer can be equipped with multi-levels of differential rolls; however, one or more levels can be used, such as if the diameter of the powder to be pulverized is small. That said, it is preferable to have multi-levels of differential rolls, since powder of the given diameter range can be obtained at a higher yield.

Further, the manufacturing method of the metal powder in one embodiment can be a method for manufacturing a tantalum powder of a given diameter range from a tantalum or niobium raw powder. The method can comprise a compression molding process for obtaining a compact by compression molding of a tantalum raw powder or niobium raw powder; a pulverization process for obtaining a pulverized powder by pulverizing said compact; a recovery process for recovering a powder of a given diameter range by sifting a pulverized powder; a return process for returning a residual powder outlying a given diameter range to the compression molding process or the pulverization process; and a thermal aggregation process for thermally agglomerating a powder of a given diameter range obtained from the recovery process. Each process will be explained in detail below.

Figure 1:
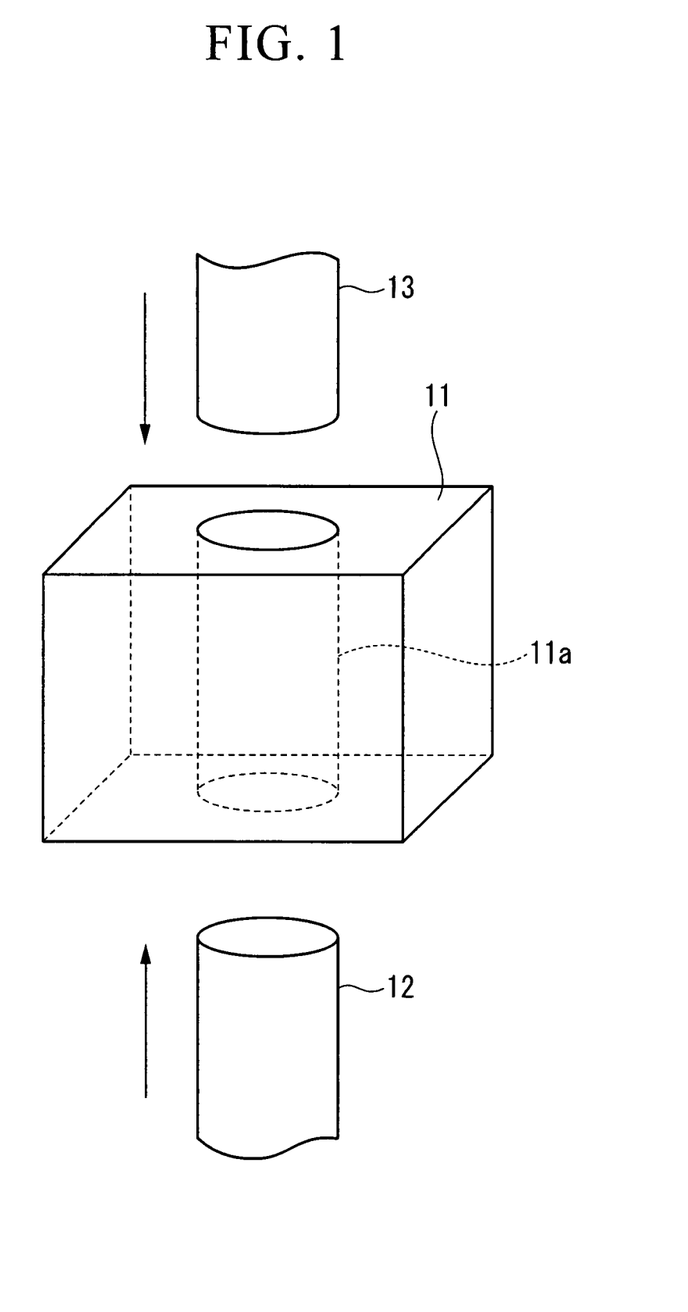
FIG. 1 is a perspective view showing one example of a press device used for the compression molding process in one embodiment of the manufacturing method of the metal powder of the present invention.

For the compression molding process, the previously described powders can be used herein. For example, a method can be employed that uses a press device to compress a raw powder filled in a die. Such a press device can be exemplified as a press device 10, as shown in FIG. 1, equipped with a rectangular molding 11 having a circular through-hole section 11a in a vertical direction, a cylindrical support 12 inserted into the through-hole 11a of the molding 11 from below, and a cylindrical pressurizer 13 inserted into the through-hole 11a of the molding 11 from above. In the press device 10, the inner diameter of the through-hole 11a is substantially equal to the outer diameter of the support 12 and the pressurizer 13.

Figure 3:
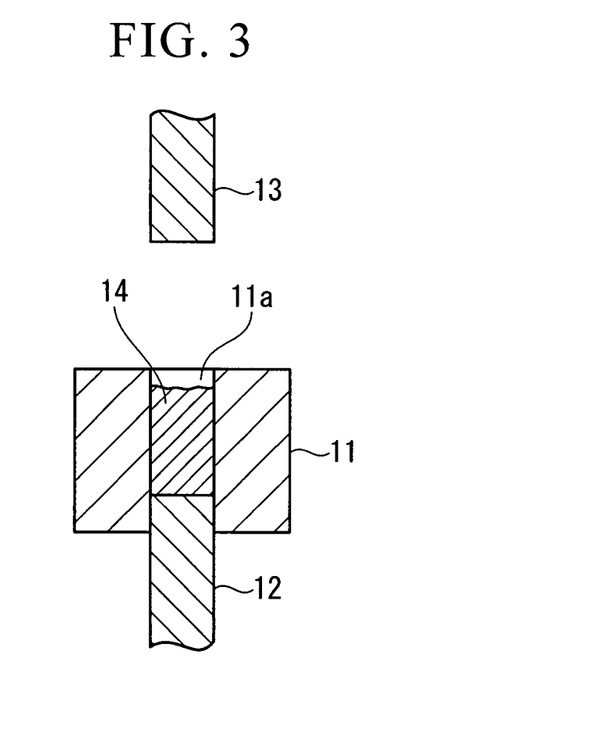
FIG. 3 is a cross section showing one process of compression molding using the press device in FIG. 1.

In compression molding with the press device 10, as shown in FIG. 2, the support 12 is first raised and slightly inserted into the lower side of the through-hole 11a of the molding 11 to create a cylindrical form. Next, as shown in FIG. 3, a given amount of the tantalum raw powder 14 is filled from the upper side of the through-hole 11a. Then, as shown in FIG. 4, the pressurizer 13 is lowered and inserted into the through-hole 11a. Then, the tantalum raw powder 14 filling the through-hole 11a is molded by compression to obtain a compact. The compact is removed from the molding 11 by lowering the support 12 and pushing it out with the pressurizer 13, or by raising the pressurizer 13 and pushing it out with the support 12. In compression molding, the volume density of the obtained compact is preferably set to be around 4-5 g/cm$^3$.

Examples of the tantalum raw powder used in any embodiment of the present invention, such as in the compression molding process embodiment of the present embodiment include tantalum fine powder obtained by the sodium reduction of tantalum salt, such as sodium tantalate fluoride in diluent salt, tantalum fine powder obtained by the hydrogen reduction of tantalum chloride, and the like. In addition, such tantalum raw powder may be treated by preliminary thermal aggregation in advance. For purposes of any embodiment herein, the tantalum powder or niobium powder can be obtained by any method, including any reduction method.

In the pulverization process, the previously described pulverization process can be used. A compact can be pulverized by a pulverizer equipped with differential rolls. The pulverizer equipped with differential rolls may be exemplified as a roll granulator 20 having three levels of differential rolls 21, as shown in FIG. 5. Wherein, the differential roll 21 has two rolls 21a, 21b that are spaced apart. These rolls reverse each other at respectively different revolutions. In addition, as shown in FIG. 6, concaves and convexes are formed on each peripheral surface of the rolls 21a, 21b at identical intervals. The two rolls 21a, 21b are placed such that a convex 21c of one roll 21a opposes a concave 21d of the other roll 21b.

Regarding the difference in peripheral velocity of the two rolls 21a, 21b in the differential roll 21, the peripheral velocity of one roll 21a is preferably faster than that of the other roll 21b by 20% or more, since a powder of a given diameter range can be obtained at high yield.

In the roll granulator 20, the three levels of differential rolls are preferably placed with decreasing space between the roll 21a and the roll 21b in order from the top. By doing so, the particle diameter can be gradually decreased, which allows the yield of a powder within a given diameter range to be increased.

When pulverizing a compact using the roll granulator 20 as described above, the compact can be fed from the upper entrance 22 utilizing gravity, the diameter can be decreased by passing through each differential roll 21 in order from the top, and the pulverized powder can be drained out of the lower exit 23 and transferred to the next process.

As a pulverizer, devices other than the roll granulator can be used if equipped with differential rolls, for example, a differential slit roll. A differential slit roll has two spaced apart rolls with flat peripheral surfaces. These rolls reverse each other at respectively different revolutions.

As a method of sifting in the recovery process, for example, a method of sifting a pulverized powder by piling two sieves with different size openings is exemplified. Wherein, one of the two sieves sifts powder at a size below the upper limit of the given diameter range but does not sift powder at a size above the upper limit of the given diameter range. The other sieve sifts powder at a size under the lower limit of the given diameter range, but does not sift powder at a size above the lower limit of the given diameter range. The former sieve is placed below the latter for usage.

In addition, as a method of sifting, for example, an oscillation method or a perikinetic method may be used. Wherein, the oscillation method refers to a method of moving the piled sieves up and down, while the perikinetic method refers to a method of circulating the piled sieves in a horizontal direction. The perikinetic method is preferred, since it causes smaller shock, a decreased amount of powder smaller than the given diameter range, and less noise.

The powder of the given diameter range obtained from said recovery process can be subjected to a thermal aggregation (or agglomeration) process. On the other hand, among residual powder outside of the given diameter range, powder smaller than the given diameter range can be returned to the compression molding process to undergo compression molding again, and powder larger than the given diameter range can be returned to the pulverization process to be pulverized again.

One example of the thermal aggregation method is described earlier. In the thermal aggregation process, for example, a method of heating a powder of a given diameter range within a furnace can be used. The temperature for thermal aggregation is preferably 900-1,200° C., more preferably around 1,050° C.

In the above described manufacturing method of the tantalum powder, a compact of loosely attached particles can be obtained by compression molding of the tantalum raw powder. In addition, when such a compact passes between two differential rolls having different revolution speeds, it allows force to be given to stretch the compact. Since tantalum has less ductility and is vulnerable to stretching, a compact composed of tantalum can be pulverized. Wherein, the compact does not pass through the differential rolls if it is not crushed to the particle size corresponding to an interval between the two rolls. Therefore, it is possible to decrease the amount of powder in which the diameter is larger than that corresponding to the interval of the two rolls. Furthermore, since pulverization by differential rolls does not have a strong impact on the compact, generation of fine powder can be inhibited. According to the one or more of the above mentioned manufacturing methods, a powder of a given diameter range can be obtained at high yield.

In particular, according to one or more of the above mentioned manufacturing methods, a tantalum powder with a small diameter and narrow particle size distribution can be obtained, such as a tantalum powder having a particle diameter of 45-75 µm, for instance, 45-63 µm, or 45-53 µm such as at a yield of 50% or more. Yield refers to the wt % of particles falling within this range based on the overall particle distribution. The yield can be, for instance, from 50% to 90%, or 60% to 85%, or 65% to 80%, or 70% to 80%.

In one or more of the above mentioned manufacturing methods of tantalum powder, a residual powder outside of the given diameter range can be returned to the compression molding process or the pulverization process after the recovery process and, therefore, it is possible to obtain a powder of a given diameter range from a powder outside of the given diameter range. Accordingly, the yield of powder of a given diameter range can be increased even further. In addition, the manufacturing methods of the present invention do not produce large particles by thermal aggregation; therefore, if the surface of the powder becomes less uneven, it is possible to return the powder to the compression molding process or the pulverization process. Consequently, the yield of powder of a given diameter range can be substantially 100% (e.g., 90% to 100%, or 90% to 99.5%, or 95% to 99%). Moreover, unevenness of the powder surface can be maintained by the manufacturing methods.

As the above-mentioned manufacturing methods of the tantalum powder can comprise a thermal aggregation process, the tantalum powder can be strengthened. Furthermore, it is sufficient to carry out thermal aggregation only once, allowing a reduction in the energy consumption required for manufacturing the tantalum powder.

The tantalum powder manufactured by one of the above mentioned manufacturing methods can fall in a given diameter range, and so can be preferably used as the anode electrode material of a capacitor.

In the above mentioned embodiments, the pulverizer can be equipped with multi-levels of differential rolls; however, only one level is necessary if the compact to be created in the compression molding process is small. That said, it is preferable to employ multi-levels of differential rolls, since this can achieve a powder of a given diameter range at high yield.

Also, the above mentioned embodiment comprises a recovery process, a return process, and a thermal aggregation process; however, it may not contain the thermal aggregation process, the recovery and return processes, or any of the three processes. The tantalum powder obtained from the case without the thermal aggregation process has less thermal history and particularly excellent sinterability. When not comprising the recovery and return processes, the tantalum powder is preferably sifted after the thermal aggregation process in order to obtain a tantalum powder of the given diameter range. If the recovery process, the return process, and/or the thermal aggregation process are not used, the pulverized powder obtained from the pulverization process is the intended tantalum powder.

The tantalum or niobium powder of the present invention can be a porous body composed of high-order particles. Wherein, high-order particle refers to a particle formed by aggregation (or agglomeration) of primary particles or secondary particles of around 30-300 nm in diameter (for example, secondary particles, tertiary particles, and the like) (30~300 nm will be primary particles). In addition, as a porous body, one with 1-7 $m^2/g$ of BET specific surface area is preferable (in the case of niobium BET is 1-15 $m^2/g$. If the BET specific surface area is less than 1 $m^2/g$, the particle may no longer be porous and may be unsuitable for forming into an anode. If the BET specific surface area exceeds 7 $m^2/g$, the strength of the particle may become insufficient and may be easily broken. The BET surface area can be 2 $m^2/g$ to 7 $m^2/g$; 3 $m^2/g$ to 7 $m^2/g$; 4 $m^2/g$ to 6 $m^2/g$. The diameter can be 50 nm to 250 nm; 100 nm to 200 nm; 70 nm to 150 nm.

For the tantalum or niobium powder of the present invention, the diameter of substantially all particles can fall within a range of 45-75 µm, preferably within a range of 45-53 µm, and more preferably within a range of 45-53 µm. Wherein, the term "substantially all" refers to preferably 95 wt % or more, such as 95 wt % to 99.9 wt %, or 97 wt % to 99.5 wt %, or 98 wt % to 99 wt %.

When the diameter of the tantalum or niobium powder is not substantially within a range of 45-75 µm, the particle size distribution expands. Therefore, it becomes difficult to form holes and/or passageways and/or pores for the conductive polymer-containing solution to pass through on the porous sintered body obtained from the tantalum or niobium powder.

The method of manufacturing the tantalum or niobium powder having the above mentioned particle size distribution is not particularly limited. However, it is preferable to employ a method of pulverizing a compact formed by compression molding of a tantalum or niobium fine powder, a method of pulverizing an agglomerate powder formed by thermal aggregation of a tantalum or niobium fine powder, and the like, since these methods can effectively manufacture the tantalum or niobium powder having said particle size distribution.

As one example of a manufacturing method of a tantalum or niobium powder having said particle size distribution, an example of manufacturing a tantalum powder by pulverizing a compact formed by compression molding of a tantalum fine powder is described below.

In this example of a manufacturing method of the tantalum powder, the tantalum fine powder (primary particles and secondary particles) are obtained by the sodium reduction of tantalum salt, such as sodium tantalate fluoride in diluent salt.

Next, the tantalum fine powder is filled in a die and a compact is obtained by compression molding, for example, using a press device (compression molding process), as described earlier.

Such a press device can be exemplified as a press device 10, as shown in FIG. 1, equipped with a rectangular molding 11 having a circular through-hole section 11a in a vertical direction, a cylindrical support 12 inserted into the through-hole 11a of the molding 11 from below, and a cylindrical pressurizer 13 inserted into the through-hole 11a of the molding 11 from above. In the press device 10, the inner diameter of the through-hole 11a is substantially equal to the outer diameter of the support 12 and the pressurizer 13.

In compression molding with the press device 10, as shown in FIG. 2, the support 12 is first raised and slightly inserted into the lower side of the through-hole 11a of the molding 11 to create a cylindrical form. Next, as shown in FIG. 3, a given amount of the tantalum raw powder 14 is filled from the upper side of the through-hole 11a. Then, as shown in FIG. 4, the pressurizer 13 is lowered and inserted into the through-hole 11a. Then, the tantalum raw powder 14 filling the through-hole 11a is molded by compression to obtain a compact. The compact is removed from the molding 11 by lowering the support 12 and pushing it out with the pressurizer 13, or by raising the pressurizer 13 and pushing it out with the support 12.

Next, the obtained compact is pulverized (as described earlier) by a pulverizer equipped with differential rolls (pulverization process). The pulverizer equipped with differential rolls may be exemplified as a roll granulator 20 having three levels of differential rolls 21, as shown in FIG. 5. Wherein, the differential roll 21 has two rolls 21a, 21b that are spaced apart. These rolls reverse each other at respectively different revolutions. In addition, as shown in FIG. 6, concaves and convexes are formed on each peripheral surface of the rolls 21a, 21b at identical intervals. The two rolls 21a, 21b are placed such that a convex 21c of one roll 21a opposes a concave 21d of the other roll 21b. Furthermore, the three levels of differential rolls are placed with decreasing space between the roll 21a and the roll 21b in order from the top.

Regarding the difference in peripheral velocity of the two rolls 21a, 21b in the differential roll 21, the peripheral velocity of one roll 21a is preferably faster than that of the other roll 21b by 20% or more, since a powder of a given diameter range can be obtained at high yield.

In the pulverization of a compact using the roll granulator 20 shown in FIG. 5, the compact is fed from the upper entrance 22 utilizing gravity, the diameter is decreased by passing through each differential roll 21 in order from the top, and the pulverized powder is drained out of the lower exit 23 and transferred to the next process.

Thereafter, the obtained pulverized powder is sifted through two sieves with different openings to recover a powder of a given diameter range (recovery process). Wherein, one of the two sieves sifts powder at a size below the upper limit of the given diameter range but does not sift powder at a size above the upper limit of the given diameter range. The other sieve sifts powder at a size under the lower limit of the given diameter range but does not sift powder at a size above the lower limit of the given diameter range. The former sieve is placed below the latter for usage.

Then, powder smaller than a given diameter range is returned to the compression molding process to be treated by compression molding again. At the same time, powder larger than a given diameter range is returned to the pulverization process to be pulverized again.

A powder of a given diameter range is thermally aggregated to obtain a tantalum powder (thermal aggregation process).

The above mentioned tantalum or niobium powder has a narrow particle diameter distribution, and so small particles do not enter into the gaps between particles. Therefore, it is easy to form holes when molding a porous sintered body by sintering. Consequently, by using the above mentioned tantalum or niobium powder for manufacturing an anode for a solid electrolytic capacitor, it is possible to manufacture an anode for a solid electrolytic capacitor in which holes are formed for the conductive polymer-containing solution to pass through, without using a hole molding material or pore forming material.

The anode for the solid electrolytic capacitor of the present invention is a porous sintered body obtained by sintering the above mentioned tantalum or niobium powder.

The temperature for sintering the tantalum or niobium powder is preferably 1,000-1,400° C., and the sintering time is preferably around 0.3-1 hour. In addition, when sintering, a lead wire may be preliminary embedded in the tantalum or niobium powder.

Since the anode for the solid electrolytic capacitor of the present invention is generated from tantalum or niobium powder having a narrow particle size distribution, it has holes (or passageways or pores) for the conductive polymer-containing solution to pass through. Using the anode for the solid electrolytic capacitor having formed holes enables improvement in the permeability of the conductive polymer-containing solution. Therefore, a cathode can be sufficiently formed inside the holes. As a result, the equivalent series resistance (ESR) of the solid electrolytic capacitor can be reduced. Furthermore, the anode is formed by a tantalum or niobium powder with a small diameter. It is possible to ensure the efficient surface area of the dielectric layer that is an oxide film of said anode, and increase the volume of the solid electrolytic capacitor.

In addition to one or more of the characteristics described above, and/or in substitution of one or more of the various characteristics set forth above for the tantalum or niobium powder of the various embodiments, the tantalum powder one or more of the following characteristics set forth in the following various paragraphs. Also, various steps from various embodiments described herein can be combined for purposes of the present invention.

In the present invention, the metal powder can have average grain size of approximately 44 to 150 μm or have a grain size range of from 55 to 150 μm and can be composed of secondary and/or tertiary particles, such as obtained from sieving. The tertiary particles are typically agglomerated.

With respect to the purity of the tantalum powder, the tantalum powder can have any desirable purity with respect to tantalum. For instance, the tantalum metal can have a purity of 95% Ta or greater, such as 99% Ta or higher, such as 99.95% Ta or higher, such as 99.99% Ta or higher, or from 99.999% Ta or higher. Various impurity levels can be as described below. Similar purities apply to niobium powder.

In at least one embodiment of the present invention, the powder and/or pellet, and/or sintered anode, can have the following characteristics, but it is to be understood that the powder can have characteristics outside of these ranges:

Purity Levels:

Oxygen content of from about 1,000 ppm to about 60,000 ppm, such as, from about 2500 ppm to about 15000 ppm (e.g., after deoxidation), such as from about 8,000 ppm to about 50,000 ppm or from about 10,000 ppm to about 30,000, or from about 12,000 ppm to about 20,000 ppm oxygen. An oxygen (in ppm) to BET (in m²/g) ratio can be from about 2,000 to about 4,000, such as from about 2,200 to about 3,800, from about 2,400 to about 3,600, from about 2,600 to about 3,400, or from about 2,800 to about 3,200, and the like.

A carbon content of from about 1 ppm to about 100 ppm and more preferably, from about 10 ppm to about 50 ppm or from about 20 ppm to about 30 ppm carbon.

A nitrogen content of from about 100 ppm to about 20,000 ppm or higher and more preferably from about 1,000 ppm to about 5,000 ppm or from about 3,000 ppm to about 4,000 ppm or from about 3,000 ppm to about 3,500 ppm nitrogen.

A hydrogen content of from about 10 ppm to about 1,000 ppm, and more preferably from about 300 ppm to about 750 ppm, or from about 400 ppm to about 600 ppm hydrogen.

An iron content of from about 1 ppm to about 50 ppm, and more preferably from about 5 ppm to about 20 ppm iron.

A nickel content of from about 1 ppm to about 150 ppm, and more preferably from about 5 ppm to about 100 ppm or from about 25 ppm to about 75 ppm nickel.

A chromium content of from about 1 ppm to about 100 ppm and more preferably from about 5 ppm to about 50 ppm or from about 5 ppm to about 20 ppm chromium.

A sodium content of from about 0.1 ppm to about 50 ppm and more preferably from about 0.5 ppm to about 5 ppm sodium.

A potassium content of from about 0.1 ppm to about 100 ppm and more preferably from about 5 ppm to about 50 ppm, or from about 30 ppm to about 50 ppm potassium.

A magnesium content of from about 1 ppm to about 50 ppm and more preferably from about 5 ppm to about 25 ppm magnesium.

A phosphorus (P) content of from about 5 ppm to about 500 ppm and more preferably from about 100 ppm to about 300 ppm phosphorus.

A fluoride (F) content of from about 1 ppm to about 500 ppm and more preferably from about 25 ppm to about 300 ppm, or from about 50 ppm to about 300 ppm, or from about 100 ppm to about 300 ppm.

The powder can have a particle size as measured by Shimatsue Size analyzer of about 2.5 μm or less; such as, from about 0.10 to about 2.0 μm, or from about 0.20 to about 0.8 μm. The powder can have a bulk density of from about 2.0 g/cc or less, or 1.80 g/cc or less, 1.5 g/cc or less, such as from about 0.80 g/cc to about 1.30 g/cc, or from about 1.0 g/cc to about 1.20 g/cc.

The powder, e.g., secondary or tertiary, can have a particle size distribution (based on overall %) as follows, based on mesh size:

+60# of from about 0.0 to about 1% and preferably from about 0.0 to about 0.5% and more preferably 0.0 or about 0.0.

60/170 of from about 45% to about 70% and preferably from about 55% to about 65%, or from about 60% to about 65%.

170/325 of from about 20% to about 50% and preferably from about 25% to about 40% or from about 30% to about 35%.

325/400 of from about 1.0% to about 10% and preferably from about 2.5% to about 7.5% such as from about 4 to about 6%.

−400 of from about 0.1 to about 2.0% and preferably from about 0.5% to about 1.5%.

The powder, when formed in to an anode with a sintering temperature of 1150° C. for 10 minutes with a formation temperature of 60° C. and a press density of 4.5 g/cc to 5.0 g/cc and a formation voltage of 4 V to 10V has a capacitance of from about 50,000 CV/g to about 800,000 CV/g, such as from about 450,000 CV/g to about 700,000 CV/g, or from about 500,000 CV/g to about 700,000 CV/g. Also, the leakage current can be less than 20 nA/μFV and can be from about 2.5 to about 15 nA/μFV or from about 3.0 to about 10 nA/μFV. The values or ranges for capacitance and/or leakage current are also possible with a sintering temperature of 1200° C. or 1250° C. for 10 minutes and/or a formation voltage of from 5 volts to 16 volts. Also, any individual value within the ranges for capacitance and leakage current can be used for purposes of the present invention.

The Ta powder of the present invention can also have a pore size distribution which can be unimodal or multi-modal, such as bi-modal. The Ta powder of the present invention can have a pore diameter, such that there is a center peak intensity at anywhere from about 0.1 μm for the pore diameter to about 0.8 μm such as from about 0.1 μm to about 0.6 μm. Also, the pore diameter can have a peak height of from about 0.3 to about 0.5 dV/d(log d), such as about 0.4 dV/d(log d). And a second peak can be present and have a center peak intensity, for instance, at anywhere about 1 to about 30 μm for the pore diameter. For purposes of the present invention these ranges can be within 20%, or within 10%, or within 5% or within 2% of the ranges described above and shown in all of the Figures.

The Ta powders of the present invention can have a BET surface area of from about 1.0 $m^2/g$ to about 20 $m^2/g$, and more preferably from about 4 to about 15 $m^2/g$ such as from about 12 to about 15 $m^2/g$.

The present invention also relates to capacitors containing or made from the powders of the present invention. For instance, the powders can form at least a part of the capacitor anode using conventional techniques. The capacitor can be a wet or solid capacitor.

The metal powders of the present invention can be nitrogen doped by any means. The addition of nitrogen may more easily allow the grain size of primary particles to be made smaller. With respect to nitrogen, the nitrogen can be in any state, such as a gas, liquid, or solid. Preferably, the nitrogen is in a gaseous form. The tantalum powders of the present invention, can have any amount of nitrogen present as a dopant or otherwise present. Nitrogen can be present as a crystalline form and/or solid solution form at any ratio. The nitrogen that can be present can be entirely in a crystalline form, or entirely in a solid solution form, or be combinations thereof. The amounts of nitrogen present in the tantalum powder can be any amount, such as from about 50 ppm to about 250,000 ppm. Other amounts include, but are not limited to, from about 100 ppm or more, from about 200 ppm or more, from about 500 ppm or more, from about 1,000 ppm or more, from about 1,000 to about 4,000 ppm, from about 1,000 ppm to about 5,000 ppm, from about 1,000 ppm to about 7,500 ppm, from about 100 ppm to about 5,000 ppm, from about 1,000 ppm to about 10,000 ppm, from about 1,000 ppm to about 20,000 ppm, from about 3,000 ppm to 50,000 ppm and the like. All of these ppm ranges are with respect to the nitrogen present in the powder.

The capacitance (CV) value of the tantalum powder of the present invention can be from 50,000 CV/g to 800,000 CV/g, such as, from 10,000 CV/g to 250,000 CV/g, or from 200,000 to 450,000 μFV/g. Tantalum powder with a CV value of 450,000 μFV/g or greater permits the manufacturing of a small size but large capacity tantalum electrolytic capacitor. With respect to capacitance, the tantalum powders, when formed into an anode, can have a capacitance of from 200,000 to 800,000 CV/g, from about 500,000 to 800,000 CV/g, from about 550,000 to 800,000 CV/g, from about 600,000 to about 800,000 CV/g, from about 650,000 to about 800,000 CV/g, from about 700,000 to about 800,000 CV/g, from about 500,000 to about 750,000 CV/g, or from about 500,000 to 700,000 CV/g, and the like. However, tantalum powder with CV values exceeding 800,000 μFV/g is difficult to manufacture. With respect to leakage, the leakage can be 50 nA/CV or less, such as 30 nA/CV or less, such as 25 nA/CV or less, 20 nA/CV or less, 10 nA/CV or less, such as from 1.0 nA/CV to 30 nA/CV.

Regarding the measuring method of CV values in the present invention, first, tantalum pellets are produced. The pellets have tantalum lead wires present. The tantalum powder is formed into pellets using a press density of 4.5 $g/cm^3$. In order to obtain this density, only the mass and pellet shape of the tantalum powder need to be defined. It is preferable to select the sintering temperature of the pellets arbitrarily such that the shrinkage ratio of the tantalum powder remains in a range of 5 to 10%. The sintering temperature is preferably in a range of from 900 to 1,000° C. Furthermore, the greater the CV value of the tantalum powder, the more preferable it is to select a lower temperature. Next, chemically converted substances are produced by chemically converting the pellets in a phosphoric acid aqueous solution of concentration 0.1 vol. % at a voltage of 6 to 10V. For the chemical conversion, in order to form a uniform (or substantially uniform) oxide film on the surface of tantalum powder, it is preferable to make an adjustment within a range when necessary: 30 to 60° C. for temperature, 4 to 20V for voltage, and 90 to 120 minutes for the treatment time. Then, the CV values of the chemically converted substances are measured in a sulfuric acid aqueous solution of concentration 30.5 vol. % under the conditions: temperature 25° C., frequency 120 Hz, and voltage 1.5V. With respect to sintering, the sintering time can be from 5 minutes to 1 hour or more, such as from 10 minutes to 30 minutes, 10 minutes to 20 minutes, or 10 minutes to 15 minutes. Any desirable sintering time can be used. With respect to sintering temperature, any desirable sintering temperature can be used. For instance, the sintering temperatures can be from 800° C. to 1,500° C., from 900° C. to 1,450° C., from 900° to 1,400° C., from 900° C. to 1,350° C., from 900° C. to 1,300° C., from 900° C. to 1,250° C., from 900° C. to 1,200° C., from 900° C. to 1,150° C., and any sintering temperatures within these ranges. With respect to press density, other press densities can be used either in the test method or in use of the tantalum powders in general. The press densities can be from about 3.0 to about 6.0 $g/cm^3$, such as 5.0 $g/cm^3$, or 5.5 $g/cm^3$, or 4.0 $g/cm^3$. With respect to the present invention, it is to be understood that the test method used to determine capacitance is simply a test for determining capacitance. The tantalum powders of the present invention can be used under a variety of electrical conditions, various formation voltages, various working voltages, various formation temperatures, and the like. With respect to formation voltage, other formation voltages can be used, such as 5 volts, 4 volts, 3 volts, and the like, for instance, 5 to 10 volts, 5 to 16 volts, or 5 to 20 volts, can be used as a formation voltage.

The tantalum powder of the present invention can be in the form of secondary particles formed by aggregating (or agglomerating) primary particles, or in the form of tertiary particles formed by further aggregating (or agglomerating) secondary particles.

The average particle size of the primary particles of the tantalum powder can be 10 to 30 nm, or 13 to 27 nm. Other ranges include 15 nm to 25 nm, 17 nm to 22 nm, or 18 nm to 20 nm, or 50 to 350 nm. Furthermore, regarding the grain distribution (or particle size distribution) of primary particles of tantalum powder, it is preferable to have a distribution in which 80% or more of the particles fall within ±5 nm to ±100 nm of the average particle size. For a distribution in which 80% or more of the particles fall within ±5 nm of the average particle size, as the particle distribution is even or uniform, when the primary particles are mutually aggregated, voids tend to be formed, thus permitting the materials making up the cathode to fully impregnate the inside of the tantalum powder when forming a tantalum electrolytic capacitor. The particle size distribution can be less than 80% with respect to particles falling within ±5 nm of the average grain size. The particle size distribution can be wherein 85% to 99% or more, or from 90% to 99% or more, or from 95% to 99% or more of the tantalum powder can be within ±5 nm of the average grain size. For purposes of the present invention, the various percent ranges provided for the particle size distribution can apply to particles that fall within ±10 nm or ±7 nm.

In one or more embodiments of the present invention, the tantalum powder (either primary, secondary, or tertiary powder) can have desirable flow rates. For instance, the flow rates of the tantalum powders of the present invention can have a flow rate of from about 30 seconds to about 3 minutes, wherein the test involves the time it takes for 20 grams of tantalum powder to pass through an orifice of 0.1 inch. The flow rates can be from about 45 seconds to about 2½ minutes, from about 60 seconds to about 2 minutes, from about 60 seconds to about 1½ minutes, as well as other flow rates.

In one or more embodiments of the present invention, the secondary particles of the tantalum powder can have desirable particle sizes. For instance, the secondary particles of the present invention (e.g., after reduction, before heat treatment) can have a D50 as determined by Microtrac of from 1 micron to 150 microns, such as from 10 microns to 125 microns, such as from 50 microns to 100 microns, such as from 75 microns to 120 microns, and the like. Further, in one or more embodiments of these D50 ranges, the D10 can range from 0.7 microns to 20 microns, such as from 1 micron to 15 microns, from 5 microns to 10 microns, and the like. Also, in one or more embodiments of the present invention, for the various D50 ranges described herein, the particles can have a D90 range of from 5 microns to 200 microns, such as from 10 microns to 175 microns, such as from 15 microns to 150 microns, from about 20 microns to about 125 microns, from about 25 microns to about 100 microns, or from about 50 microns to about 75 microns, and the like. The lower D10 numbers and lower D90 numbers typically will be more applicable to the lower D50 sizes mentioned herein, such as sizes from 1 micron to 75 microns. Furthermore, the higher end D10 and higher end D90 numbers will be more applicable to the upper ranges of the D50 range, such as from 75 microns to 150 microns.

Furthermore, in said embodiments, the tantalum raw powder is used as raw agglomerate powder; however, raw powder composed of niobium (hereinafter, referred to as niobium raw powder) may be used. With the niobium raw powder, the same effects can be obtained as when using tantalum raw powder.

The present invention will be further clarified by the following examples, which are intended to be exemplary of the present invention.

EXAMPLES

Example 1

First, agglomerate powder was obtained by thermal aggregation of 100 g of tantalum fine powder at 1,100° C., and then the agglomerate powder was preliminary crushed by a chopper mill. Next, in a pulverization process, tantalum powder was obtained by pulverizing the preliminary crushed powder using a roll granulator equipped with three levels of differential rolls totaling 100 mm in length. Wherein, for each differential roll, the interval between the first level rolls was determined as 0.6 mm, the interval between the second level rolls was determined as 0.3 mm, and the interval between the third level rolls was determined as 0.2 mm. In addition, the peripheral velocity of one of the rolls was set to be 30% faster than that of the other roll.

Comparative Example 1

Instead of the pulverization process in Example 1, tantalum powder was obtained in the same way as Example 1, with the exception that the agglomerate powder was crushed using a speed mill equipped with a screen (diameter 250 mm, opening 0.5 mm) and a three-level cutter at 300 rpm.

With respect to the tantalum powder obtained in Example 1 and Comparative Example 1, the particle size distribution was examined by sifting through 100 mesh (opening 150 μm) and 400 mesh (opening 38 μm) sieves. In addition, from the scanning electron micrograph, the ratio of plane surface of each tantalum powder was calculated. Table 1 shows the results.

TABLE 1

|  | Example 1 | Comparative Example 1 |
| --- | --- | --- |
| 100 mesh on | <0.1 Wt % | 27 Wt % |
| 100-400 mesh | 89 Wt % | 15 Wt % |
| 400 mesh pass | 11 Wt % | 58 Wt % |
| Plane surface ratio | 65% | 75% |

For the tantalum powder in Example 1, obtained by pulverizing agglomerate powder by a pulverizer equipped with differential rolls, the particle size distribution was narrow and the plane surface ratio exceeded 70%. The 100 to 400 mesh distribution in the present invention can be 50 wt % to 99 wt %; 60 wt % to 95 wt %; 70 wt % to 95 wt %; 75 wt % to 90 wt %; 80 wt % to 90 wt %; 85 wt % to 95 wt %.

Example 2

After granulated powder was obtained by granulating 100 g of tantalum fine powder obtained by the sodium reduction of tantalate sodium fluoride in molten salt using water as a binder, the agglomerate powder was obtained by thermal aggregation of the granulated powder at 1,000° C.

Comparative Example 2

The tantalum powder was obtained by reducing tantalum oxide powder of 325 mesh pass (particle size under 45 μm) with solid magnesium.

Comparative Example 3

Instead of the pulverization process in Example 2, the tantalum powder was obtained in the same way as Example 2, with the exception that the agglomerate powder was crushed by using the same speed mill as Comparative Example 1 at a cutter revolution of 300 rpm.

For the tantalum powder obtained in Example 2 and Comparative Examples 2 and 3, the fluidity was evaluated in conformity to JIS Z 2505-1960.

In addition, a pellet with a diameter of 1 mm was molded (with a press density of 4 to 5 g/cm$^3$) from 6 mg of tantalum powder and the pellet was sintered at 1,300° C. for 20 minutes to obtain a sintered body. The pullout strength was measured by loading the sintered body in a radial direction. It can be said that the higher the pullout strength, the higher the sinterability.

Furthermore, from the scanning electron micrograph, the plane surface ratio of each tantalum powder was calculated. Table 2 shows the results.

TABLE 2

|  | Example 2 | Comparative Example 2 | Comparative Example 3 |
| --- | --- | --- | --- |
| Plane surface ratio | 60% | 25% | 80% |
| Fluidity | Free through flow | Free through flow | Did not flow |
| Pullout strength | 9 kg | 1.5 kg | Unmeasured |

For the tantalum powder in Example 2, obtained by crushing agglomerate powder by a pulverizer equipped with differential rolls, the plane surface ratio was within a range of 30-70% and the fluidity was high. The pullout strength and the sinterability were also high. The pullout strength can be 2 kg to 12 kg; 4 kg to 10 kg; 6 kg to 10 kg; 8 kg to 10 kg.

On the other hand, for the tantalum powder in Comparative Example 2, obtained by reducing tantalum oxide powder of 325 mesh pass with solid magnesium, the plane surface ratio was under 30% and the sinterability was low.

Furthermore, for the tantalum powder in Comparative Example 3, obtained by crushing agglomerate powder by a crusher, the plane surface ratio exceeded 70% and the fluidity was low.

Example 3

First, in the compression molding process, a cylindrical compact of around 3 mm in diameter was obtained by compression molding 100 g of tantalum fine powder with a press molding machine. Next, in the pulverization process, a tantalum powder was obtained by pulverizing the compact using a roll granulator equipped with three levels of differential rolls totaling 100 mm in length. Wherein, for each differential roll, the interval between the first level rolls was determined as 0.6 mm, the interval between the second level rolls was determined as 0.3 mm, and the interval between the third level rolls was determined as 0.2 mm. In addition, the peripheral velocity of one of the rolls was set to be 30% faster than that of the other roll.

Comparative Example 4

Instead of the pulverization process in Example 3, a crushed powder was obtained in the same way as Example 3, with the exception that the compact was crushed using a speed mill equipped with a screen (diameter 250 mm, opening 0.5 mm) and a three-level cutter at a cutter revolution speed of 300 rpm.

With respect to the pulverized powder obtained in Example 3 and the crushed powder obtained in Comparative Example 4, the particle size distribution was examined by sifting through 100-mesh (opening 150 µm) and 400-mesh (opening 38 µm) sieves. Table 3 shows the results.

In evaluating the particle size distribution, as the amount of tantalum powder of 100-400 mesh (150-38 µm) diameter range increases, the distribution decreases, which means the objective was achieved.

TABLE 3

|  | Example 3 | Comparative Example 4 |
| --- | --- | --- |
| 100 mesh on | <0.1 Wt % | 27 Wt % |
| 100-400 mesh | 89 Wt % | 15 Wt % |
| 400 mesh pass | 11 Wt % | 58 Wt % |

Example 4

After 100 g of tantalum fine powder was treated by low temperature preliminary aggregation at 900° C., a cylindrical compact of around 5 mm in diameter was obtained by compression molding with a press molding machine in the compression molding process. Then, in the pulverization process, the compact was pulverized by the same roll granulator as that in Example 3 to obtain a pulverized powder.

Comparative Example 5

Instead of the pulverization process in Example 4, a crushed powder was obtained in the same way as Example 4, with the exception that the compact was crushed by using the same speed mill as Comparative Example 4 at a cutter revolution speed of 300 rpm.

With respect to the pulverized powder obtained in Example 4 and the crushed powder obtained in Comparative Example 5, the particle size distribution was examined by sifting through 100-mesh and 400-mesh sieves. Table 4 shows the results.

TABLE 4

|  | Example 4 | Comparative Example 5 |
| --- | --- | --- |
| 100 mesh on | <0.1 Wt % | 37 Wt % |
| 100-400 mesh | 81 Wt % | 45 Wt % |
| 400 mesh pass | 19 Wt % | 18 Wt % |

In the manufacturing method of Examples 3 and 4 in which the compact obtained by compression molding of tantalum fine powder was pulverized by a pulverizer equipped with differential rolls, the yield of tantalum powder of a given diameter range was high.

On the contrary, in the manufacturing method of Comparative Examples 4 and 5 in which the compact was crushed by a speed mill instead of being pulverized by a pulverizer equipped with differential rolls, the yield of tantalum powder of a given diameter range was low.

Example 5

After 100 g tantalum fine powder was treated by low temperature preliminary aggregation at 900° C., a cylindrical compact of around 3 mm in diameter was obtained by compression molding with a press molding machine in the compression molding process. Next, in the pulverization process, a tantalum powder was obtained by pulverizing the compact using a roll granulator equipped with four levels of differential rolls totaling 100 mm in length. Wherein, for each differential roll, the interval between the first level rolls was determined as 0.6 mm, the interval between the second level rolls was determined as 0.3 mm, the interval between the third level rolls was determined as 0.2 mm, and the interval between the forth level rolls was determined as 0.1 mm. In addition, the peripheral velocity of one of the rolls was set to be 30% faster than that of the other roll.

Among the obtained pulverized powder, 400-mesh pass products were treated by compression molding and pulverization again to obtain a pulverized powder. Then, the first pulverized powder and the second pulverized powder were mixed, and the mixed powder was sifted through the 250-mesh (opening 63 µm) and 325-mesh (opening 45 µm) sieves to examine the particle size distribution. Table 5 shows the results.

Comparative Example 6

After 100 g of tantalum fine powder was treated by low temperature preliminary aggregation at 900° C., a cylindrical compact of around 5 mm in diameter was obtained by compression molding with a press molding machine in the compression molding process. Next, 100 g of tantalum coarse powder obtained by preliminary crushing the compact to around 3 mm was crushed by the same speed mill as that in Comparative Example 4. Then, the obtained crushed powder was sifted through the 250-mesh (opening 63 μm) and 325-mesh (opening 45 μm). The 325-mesh products were treated by compression molding again to form a compact, and the 250-mesh-on products were mixed in the compact. The mixed product was crushed by a speed mill. After repeating this process six times, the powder amounts of 250-mesh pass, 250-325 mesh and 325-mesh on for each time were accumulated to examine the ultimate particle size distribution. Table 5 shows the results.

TABLE 5

|  | Example 5 | Comparative Example 6 |
| --- | --- | --- |
| 250 mesh on | <0.1 Wt % | 3 Wt % |
| 250-325 mesh | 99 Wt % | 68 Wt % |
| 325 mesh pass | <1 Wt % | 29 Wt % |

In the manufacturing method of Example 5 in which the compact obtained by compression molding of the tantalum fine powder was pulverized by a pulverizer equipped with differential rolls and a powder outlying the given diameter range was returned to the compression molding process or the pulverization process, a tantalum powder with significantly narrow particle size distribution was obtained. The 250-325 mesh distribution can be 70 wt % to 99.9 wt %; 75 wt % to 99.5 wt %; 80 wt % to 99.5 wt %; 85 wt % to 99 wt %; 90 wt % to 99 wt %; 95 wt % to 99 wt %.

On the contrary, in the manufacturing method of Comparative Example 6 in which the compact was crushed by a speed mill instead of being pulverized by a pulverizer equipped with differential rolls, even though the compression molding and the crush process were repeated six times for the powder outlying the given diameter range, it could not sufficiently narrow the particle size distribution.

Example 6

After 100 g of tantalum fine powder was treated by low temperature preliminary aggregation at 900° C., a cylindrical compact of around 5 mm in diameter was obtained by compression molding with a press molding machine in the compression molding process. Next, in the pulverization process, a tantalum powder was obtained by pulverizing the compact using a roll granulator equipped with three levels of differential rolls totaling 100 mm in length. Wherein, for each differential roll, the interval between the first level rolls was determined as 0.6 mm, the interval between the second level rolls was determined as 0.3 mm, and the interval between the third level rolls was determined as 0.1 mm. In addition, the peripheral velocity of one of the rolls was set to be 30% faster than that of the other roll.

Among the obtained pulverized powder (the first pulverized powder), 400-mesh pass products were treated by compression molding and pulverization again to obtain a pulverized powder (the second pulverized powder). The first pulverized powder and the second pulverized powder were then mixed, and the mixed powder was sifted through the 250-mesh (opening 63 μm) and 325-mesh (opening 45 μm) sieves to examine the particle size distribution. Table 6 shows the results.

Comparative Example 7

After 100 g of tantalum fine powder was treated by low temperature preliminary aggregation at 900° C., a cylindrical compact of around 5 mm in diameter was obtained by compression molding with a press molding machine in the compression molding process. Next, 100 g of tantalum coarse powder obtained by preliminary crushing the compact to around 3 mm was crushed by a speed mill equipped with a screen (diameter 250 mm, opening 0.5 mm) and a three-level cutter at a cutter revolution speed of 300 rpm. The obtained crushed powder was then sifted through the 250-mesh (opening 63 μm) and 325-mesh (opening 45 μm). The 325-mesh products were treated by compression molding again to form a compact, and the 250-mesh-on products were mixed in the compact. The mixed product was crushed by a speed mill. After repeating this process six times, each time data on the amount of powder from 250-mesh pass, 250-325 mesh and 325-mesh-on was accumulated to examine the ultimate particle size distribution. Table 6 shows the results.

TABLE 6

|  | Example 6 | Comparative Example |
| --- | --- | --- |
| 250 mesh on | <0.1 Wt % | 3 Wt % |
| 250-325 mesh | 99 Wt % | 68 Wt % |
| 325 mesh pass | <1 Wt % | 29 Wt % |

The anode for the solid electrolytic capacitor having holes formed can be obtained without using a hole molding material (or pore forming material) by sintering the tantalum powder described in the embodiment in which the diameter of 99 Wt % or more of particles falls within a range of 45-63 μm.

On the other hand, when sintering the tantalum powder described in the comparative example containing particles of less than 45 μm in diameter at approximately 30 Wt %, the particles are filled densely, making hole formation difficult.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

The invention claimed is:

1. A method of making metal powder, comprising: a thermal aggregation process for obtaining agglomerate powder by thermal aggregation of raw powder comprising tantalum or niobium or both; and a pulverization process for pulverizing said agglomerate powder by a pulverizer equipped with a plurality of levels of differential rolls, wherein said differential rolls comprise two rolls spaced by an interval of 0.1 mm or more at each level of said plurality of levels, wherein the interval decreases from a top level of the plurality of levels, each roll of said two rolls at said each level having a peripheral velocity, wherein the peripheral velocity of one roll is faster than the peripheral velocity of the other roll by 20% or more.

2. The method of claim 1, further comprising: a preliminary crushing process for crushing agglomerate powder prior to said pulverization process.

3. The method of claim 2, wherein said raw powder is pulverized raw powder obtained by compression molding of tantalum fine powder or niobium fine powder that is then pulverized by a pulverizer equipped with differential rolls.

4. The method of claim 1, wherein said raw powder is pulverized raw powder obtained by compression molding of tantalum fine powder or niobium fine powder that is then pulverized by a pulverizer equipped with differential rolls.

5. The method of claim 1, wherein said pulverizing of the agglomerate powder forms pulverized powder.

6. The method of claim 1, wherein said differential rolls comprise two rolls, wherein one of the rolls has a convex peripheral surface that opposes a concave peripheral surface of the other roll.

7. The method of claim 1, wherein said pulverizer comprises multi-levels of said differential rolls.

8. The method of claim 1, wherein said agglomerate powder, after said pulverizing, has a primary particle size of from 30 nm to 300 nm in diameter.

9. The method of claim 1, wherein said metal powder, after said pulverizing, has a BET surface area of from 2 $m^2/g$ to 7 $m^2/g$.

10. The method of claim 1, wherein said metal powder, when formed into an anode with a sintering temperature of 1,150° C. for 10 minutes with a formation temperature of 60° C. and a press density of 4.5 g/cc to 5.0 g/cc and a formation voltage of 4 V to 10 V has a capacitance of from about 50,000 CV/g to about 800,000 CV/g.

11. The method of claim 1, wherein said metal powder is tantalum and has a pore diameter with a center peak intensity of from about 0.1 μm to about 0.8 μm.

12. The method of claim 1, wherein the pulverizer comprises three or more levels of said differential rolls.

13. The method of claim 1, wherein the plurality of levels comprise two levels that decrease below said top level.

14. The method of claim 1, wherein said pulverizing comprises feeding said agglomerate powder by gravity to the top level of said plurality of levels of differential rolls.

15. The method of claim 1, wherein said plurality of levels of differential rolls comprise two levels or more of two rolls spaced by an interval of 0.2 mm or more.

16. A method of making a metal powder comprising: a compression molding process for obtaining a compact by compression molding of tantalum raw powder or niobium raw powder; and a pulverization process for pulverizing said compact by a pulverizer equipped with a plurality of levels of differential rolls, wherein said differential rolls comprise two rolls spaced by an interval of 0.1 mm or more at each level of said plurality of levels, wherein the interval decreases from a top level of the plurality of levels, each roll of said two rolls at said each level having a peripheral velocity, wherein the peripheral velocity of one roll is faster than the peripheral velocity of the other roll by 20% or more.

17. The method of claim 16, further comprising: a thermal aggregation process for thermally agglomerating a pulverized powder obtained from the pulverization process.

18. The method of claim 16, further comprising: a recovery process for recovering a powder of a given diameter range by sifting a pulverized powder obtained from the pulverization process; and a return process for returning a residual powder outlying the given diameter range to the compression molding process or the pulverization process after the recovery process.

19. The method of claim 18, further comprising: a thermal aggregation process for thermally agglomerating a powder of a given diameter range recovered from the recovery process.

20. A method to form flowable tantalum or niobium powder comprising:
    a) wet granulating tantalum or niobium powder to form granulated powder;
    b) subsequently crushing said granulated powder to form aggregated powder comprising a diameter range;
    c) recovering the aggregated powder of said diameter range by sifting said aggregated powder and returning a residual powder outlying said diameter range for wet granulating or crushing; and
    d) subsequently heating said aggregated powder recovered of said diameter range to obtain a thermally agglomerated powder, wherein said powder is flowable and agglomerated.

21. The method of claim 20, wherein said agglomerated powder, after said crushing, has a primary particle size of from 30 nm to 300 nm in diameter.

22. The method of claim 20, wherein said agglomerated powder, after said pulverizing, has a BET surface area of from 2 $m^2/g$ to 7 $m^2/g$.

23. The method of claim 20, wherein said agglomerated powder, when formed into an anode with a sintering temperature of 1,150° C. for 10 minutes with a formation temperature of 60° C. and a press density of 4.5 g/cc to 5.0 g/cc and a formation voltage of 4 V to 10 V has a capacitance of from about 50,000 CV/g to about 800,000 CV/g.

24. The method of claim 20, wherein said agglomerated powder is tantalum and has a pore diameter with a center peak intensity of from about 0.1 μm to about 0.8 μm.

* * * * *